United States Patent [19]

Loreto

[11] Patent Number: 4,973,856
[45] Date of Patent: Nov. 27, 1990

[54] HYDROELECTRIC GENERATOR SYSTEM

[76] Inventor: Pellegrini Loreto, Via Bronte, 52 Torre Gaia (Roma), Italy

[21] Appl. No.: 267,559

[22] Filed: Nov. 7, 1988

[30] Foreign Application Priority Data

Jul. 1, 1988 [IT] Italy .................. 48148 A/88

[51] Int. Cl.$^5$ ............................. F03B 7/00
[52] U.S. Cl. ................................. 290/54
[58] Field of Search ............. 290/43, 54; 60/398; 415/906; 416/197 A

[56] References Cited

U.S. PATENT DOCUMENTS

| | | | |
|---|---|---|---|
| 530,118 | 12/1894 | Nichols | 60/398 X |
| 1,653,970 | 12/1927 | Rugger | 415/906 X |
| 4,241,283 | 12/1980 | Storer, Sr. | 290/54 |
| 4,270,056 | 5/1981 | Wright | 290/54 |
| 4,717,831 | 1/1988 | Kikuchi | 290/54 X |

FOREIGN PATENT DOCUMENTS 56-129770 10/1981 Japan ........................ 290/54

*Primary Examiner*—A. D. Pellinen
*Assistant Examiner*—W. E. Duncanson, Jr.
*Attorney, Agent, or Firm*—Beveridge, DeGrandi & Weilacher

[57] ABSTRACT

The water inflow structure for a hydroelectric generator system has a step which cooperates with two adjacent blades of a runner to retain a quantity of water, the weight of which rotates the runner. Each blade of the runner has a forward surface which is inclined when the blade is at its highest position, to prevent water from overlying the runner shaft to produce reverse rotation. An inflow opening is formed in the step to admit water past a blade which is at the step.

4 Claims, 1 Drawing Sheet

U.S. Patent
Nov. 27, 1990
4,973,856
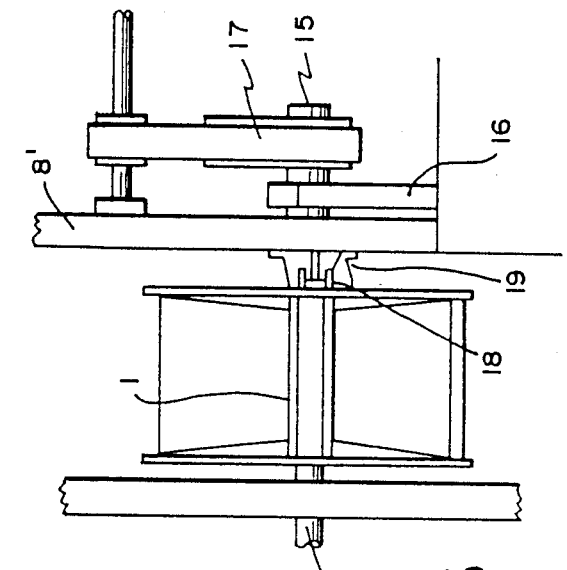
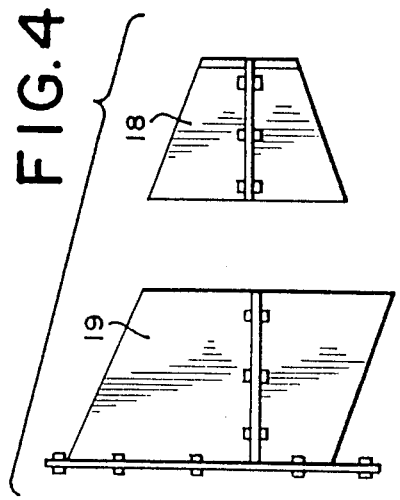

HYDROELECTRIC GENERATOR SYSTEM

BACKGROUND OF THE INVENTION

The present invention concerns an electric current generator operated by the energy of rivers, brooks, water flows and the like.

It is already well known that the exploitation of hydroelectric energy represents the most ecologic solution to the energy problem as it is not polluting. Until now, this exploitation has been practiced only where there has been a considerable water drop and where the potential energy is transformed into kinetic energy for operating alternators, generators and similar.

It is the aim of the present invention to exploit the energy of great water masses in motion, with slight slopes as it occurs in most water flows, and carrying more than two cubic meters per second.

SUMMARY OF THE INVENTION

The inflow structure includes lateral walls, overflow openings in the lateral walls for discharging excess water when there are high flow conditions, and a step which is located between the lateral walls for cooperation with a bladed runner. The runner includes blades extending out from a shaft, and circular end elements which seal against the lateral walls of the inflow structure. Water is admitted to spaces between the blades so that rotation of the runner is produced by the weight of the water. An inflow opening is formed in the step to admit water past a blade at the step. To prevent water from overlying the shaft and tending to produce reverse rotation of the runner, each blade has a forward surface which, when the blade is at its highest position, is inclined from vertical.

Preferably, there is a post means for supporting the step. The runner is connected to an alternator by a transmission which includes a water seal comprising an internal water guard member located inside an external water guard member. The inflow structure may have inlet openings for receiving water from tubes which deliver water from higher elevations; and, to prevent debris from getting into these openings, oblique nets or other means can be provided.

The present invention will be described more in detail hereinbelow according to the attached figures, in which a preferred embodiment is shown.

BRIEF DESCRIPTION OF THE DRAWINGS

FIG. 1 is a schematic side view of the electric blade generator.

FIG. 2 is a schematic plan view of the device inserted in the inflow structure.

FIG. 3 is a schematic end view of the connection with the alternator or similar with the sealing details.

FIG. 4 is an exploded view of the elements of a seal for the runner shaft.

DETAILED DESCRIPTION

Relating to the details of the figures, the generator according to the present invention includes a runner 1 which has a shaft 1a and blades 2, each provided with an inclined surface 3 that will prevent reverse rotation because the incoming water will never reach the rotation axis. The water flows downwardly through the inflow opening 5 in the step 4, and the water produces rotation of the runner 1 due to the weight of water accumulated in spaces 6 between said blades 2.

At the lateral ends of the runner 1, circular members 7 are provided for sealing relation with the lateral walls 8 of the inflow structure 9.

Plates 10 control the water inflow so as to avoid reverse rotation of the runner.

The water inflow structure has overflow openings 11 in its lateral walls 12 for allowing the discharge of capacity excess which occurs when the river is swollen.

In a possible variant that may be applied when the river does not allow the use of the system as described above, the water may be led into large tubes running parallel to the river, accumulating energy due to the difference in elevation, and then being discharged through circular openings 13 or similar provided in the inflow structure 9 for the runner 1.

The inlets 13 from the tubes will be protected by an oblique net 20 that will catch leaves and other things carried by the water.

Posts 14 are provided for the support of the structure.

In one preferred embodiment the dimensions of the system are the following:

diameter of runner 1=6 meters length of the blades=2 meters weight of the water in sections 6 between blades 2=60 quintals.

For what concerns the transformation into electric energy according to FIG. 3, shaft 15 for rotating an alternator projects from the runner 1 and passes through a wall 8'. A column 16 supports a bearing. A flywheel is associated with a belt 17. To prevent infiltrations of water into the electric mechanism, there are internal and external water guards 18 and 19 where the shaft passes through the wall 8'.

I claim:

1. A hydroelectric generator, comprising,
   an inflow structure provided with lateral walls and a step which is located between said lateral walls,
   a runner provided with a shaft, blades extending out from said shaft, and circular elements at the lateral ends of the runner; said circular elements being in sealing relation to said lateral walls of the inflow structure;
   said step having an inflow opening formed therein for admitting water past a blade which is at said step,
   each of said blades having an outer edge which moves past said step, a forward surface and a rear surface; each said forward surface being inclined when the blade is at its highest position to prevent reverse rotation produced by water getting above the shaft, said water being admitted to spaces between the blades so that rotation of the runner is produced by weight of the water,
   said inflow structure having overflow openings in its lateral walls to discharge excess water when there are high flow conditions.

2. A device according to claim 1 having post means for supporting the step, and a mechanical transmission means for connecting the runner to an alternator, said transmission means including a water seal which has an internal water guard member located inside an external water guard member.

3. A hydroelectric generator according to claim 1 wherein the inflow structure has inlet opening means for receiving water from tubes which deliver water from higher elevations.

4. A hydroelectric generator according to claim 3 having oblique means for preventing debris from getting into said inlet opening means.

* * * * *